H. JULIAN.
AIRPLANE SAFETY APPLIANCE.
APPLICATION FILED MAR. 9, 1921.

1,379,264. Patented May 24, 1921.

Inventor
Hubert Julian
By
William C Linton
Attorney

UNITED STATES PATENT OFFICE.

HUBERT JULIAN, OF MONTREAL, QUEBEC, CANADA.

AIRPLANE SAFETY APPLIANCE.

1,379,264. Specification of Letters Patent. Patented May 24, 1921.

Application filed March 9, 1921. Serial No. 450,801.

*To all whom it may concern:*

Be it known that I, HUBERT JULIAN, a subject of the King of Great Britain, residing at Montreal, in the Province of Quebec, Canada, have invented certain new and useful Improvements in Airplane Safety Appliances; and I do hereby declare that the following is a full, clear, and exact description of the invention, such as will enable others skilled in the art to which it appertains to make and use the same.

The present invention relates to new and useful improvements in safety appliances for airplanes.

The primary object of the invention is the provision of a safety appliance for airplanes so constructed as to prevent the machine from falling in case of engine trouble and thereby preventing resultant damage to the machine or injury to the occupants.

Another object of the invention is the provision of a machine having a collapsible parachute attachment secured thereto and positioned preferably thereabove, together with means for raising the said parachute attachment from inoperative to operative position.

A further object of the invention is the provision of a safety appliance for airplanes including a parachute attachment adapted to be secured thereto and which is normally disposed in closed position, together with a suitable fan or propeller adapted to raise the said parachute mechanism to its extended position when desired.

A still further object of the invention is the provision of a safety appliance for airplanes, which will be comparatively simple and inexpensive to manufacture, reliable, and efficient in use, and readily operated.

With the above and other objects in view, the present invention resides in the novel features of construction, formations, combinations and arrangements of parts to be hereinafter more fully described, claimed, and illustrated in the accompanying drawing forming a part of the present application, and in which:

Figure 1:
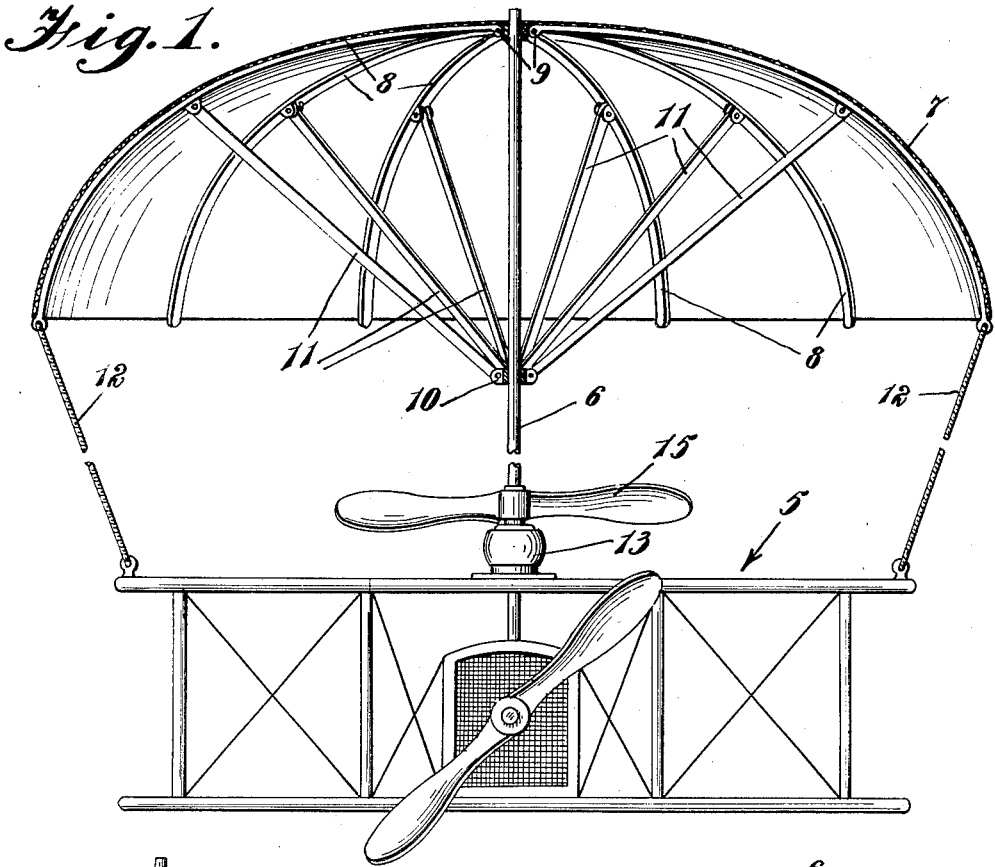
Figure 1 is a front view of an airplane showing the invention applied thereto and in operative position.

Referring now to the accompanying drawing by corresponding characters of reference throughout the several views, the numeral 5 designates in general a conventional form of airplane from the central portion of which extends a vertical shaft 6, the latter extending above the upper plane as clearly shown in Fig. 1.

A parachute attachment is shown at 7 and includes a plurality of ribs 8 pivoted at their upper ends, as at 9, to the upper end of the shaft 6, and connected to a sliding ring 10 located upon the shaft by the stays 11. As the ring moves downwardly, the parachute 7 will collapse from the extended position shown in Fig. 1 to the position shown in Fig. 2.

Certain of the lower ends of the ribs 8 are connected to the upper portion of the machine 5 by flexible cables designated at 12.

A motor 13 is mounted upon the upper portion of the machine and has rotatably connected thereto a sleeve 14 which surrounds the shaft 6 for rotation thereon.

A fan 15 is carried by the sleeve 14 being preferably keyed thereto and includes the fan blades 16 which are positioned below the lower end of the parachute.

This motor 13 may be actuated by a suitable storage battery, not shown.

Figure 2:
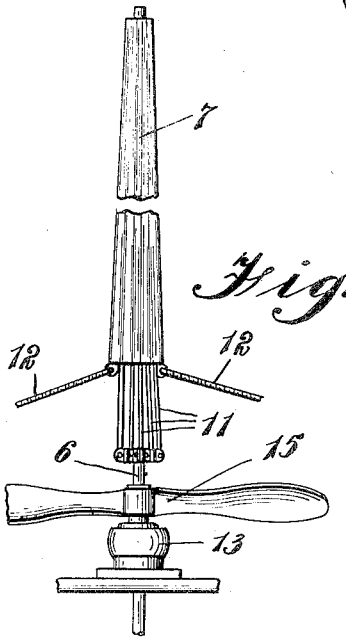
Fig. 2 is a view showing the attachment in its normal or inoperative position; and, Fig. 3 is a detail view illustrating the means of actuating the fan.
Figure 3:
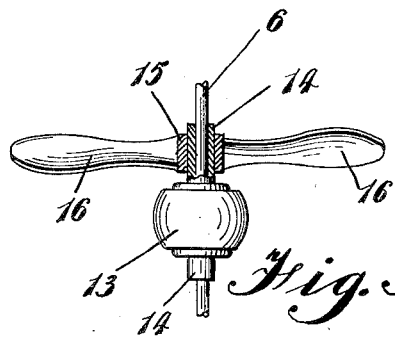

The operation of the device is as follows:

In case of engine trouble or any other difficulties which would cause the machine to fall to the ground without control, the motor 13 is set in operation, which rotates the fan 16 with sufficient rapidity to raise the parachute from the position shown in Fig. 2 to that shown in Fig. 1, and the speed of the fan is so controlled that the air driven against the underside of the parachute will allow the machine to descend gradually and without danger of injury thereto or to the occupants.

From the foregoing description taken in connection with the accompanying drawing, it will be manifest that a safety appliance for airplanes is provided which will fulfil all of the necessary requirements of such a device, and it should be understood in this connection, that various minor changes in the specific details of construction can be resorted to within the scope of the appended claims, without departing from the spirit or sacrificing any of the advantages of the invention.

Having thus fully described my invention, what I claim as new and desire to protect by Letters Patent is:—

1. The combination of an airplane and an extensible safety attachment secured thereto, a fan for moving the safety attachment to its extended position, and an independent motor for actuating said fan.

2. The combination with an airplane of a safety attachment secured thereto, and including an extensible mechanism, a fan for forcing the extensible mechanism to extended position, and an independent motor for actuating said fan.

3. The combination with an airplane of a safety attachment carried thereby and including a vertical shaft, an extensible member slidable upon the shaft, a sleeve rotatable upon the shaft, a fan secured to one end of the sleeve for forcing the extensible mechanism to extended position, and a motor secured to the opposite end of the sleeve for actuating the fan.

4. The combination with an airplane, of a shaft extending thereabove, a parachute attachment carried by the shaft, a motor mounted adjacent said shaft, a sleeve actuated by the motor and surrounding the shaft, a fan carried by the sleeve and positioned below the parachute mechanism, and flexible cables connecting the parachute attachment with the airplane.

In witness whereof I have hereunto set my hand.

HUBERT JULIAN.